US012741854B2

(12) United States Patent
Bangalore Srinivas

(10) Patent No.: US 12,741,854 B2
(45) Date of Patent: Sep. 22, 2026

(54) LIFT AND ROTATE UNIT FOR LIFTING AND ROTATING A PLURALITY OF PAYLOADS

(71) Applicant: Tata Consultancy Services Limited, Mumbai (IN)

(72) Inventor: Venkatesh Prasad Bangalore Srinivas, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 655 days.

(21) Appl. No.: 17/205,407

(22) Filed: Mar. 18, 2021

(65) Prior Publication Data

US 2022/0002122 A1 Jan. 6, 2022

(30) Foreign Application Priority Data

Jul. 2, 2020 (IN) ............................ 202021028290

(51) Int. Cl.
*B66F 7/14* (2006.01)
*B66F 7/28* (2006.01)

(52) U.S. Cl.
CPC . *B66F 7/14* (2013.01); *B66F 7/28* (2013.01)

(58) Field of Classification Search
CPC .................................... B66F 7/14; B66F 7/28
See application file for complete search history.

(56) References Cited

U.S. PATENT DOCUMENTS

2013/0177379 A1 7/2013 Hoffman et al.

FOREIGN PATENT DOCUMENTS

| | | | | |
|---|---|---|---|---|
| CN | 105947506 A * | 9/2016 | .......... | B65G 1/0492 |
| DE | 102017129468 A1 | 6/2019 | | |
| WO | WO-2020029505 A1 * | 2/2020 | ............... | B66F 7/06 |

OTHER PUBLICATIONS

Machine Translation of CN-105947506-A. "Intelligent Transfer Robot for Warehouse". By Lin Hongfei. Zhang Long, Zhang Peiyang. (Year: 2016).*
Machine Translation of WO-2020029505-A1 (Year: 2020).*

* cited by examiner

*Primary Examiner* — Nirvana Deonauth
(74) *Attorney, Agent, or Firm* — Finnegan, Henderson, Farabow, Garrett & Dunner, LLP

(57) ABSTRACT

In robotic system, lot of complex mechanism exists for lifting/rotating payloads at industrial warehouse. A lift and rotate unit to perform lifting and rotating of plurality of payloads is provided. The lift and rotate unit with a first drive unit include plurality of lift gears, lead screw shaft, lift motor, lead screw nut, lift motor gear, and a top plate; a second drive unit with plurality of rotary gears, driven rotary gear, rotary motor, rotary motor gear, and a rotating plate; the top plate with at least one guide shaft from plurality of guide shafts is configured as a surface on which the plurality of payloads is loaded; and the rotating plate with at least one linear bearing from a plurality of linear bearings to house the plurality of guide shafts at a plurality of corners and to rotate the top plate by the second drive unit.

15 Claims, 20 Drawing Sheets

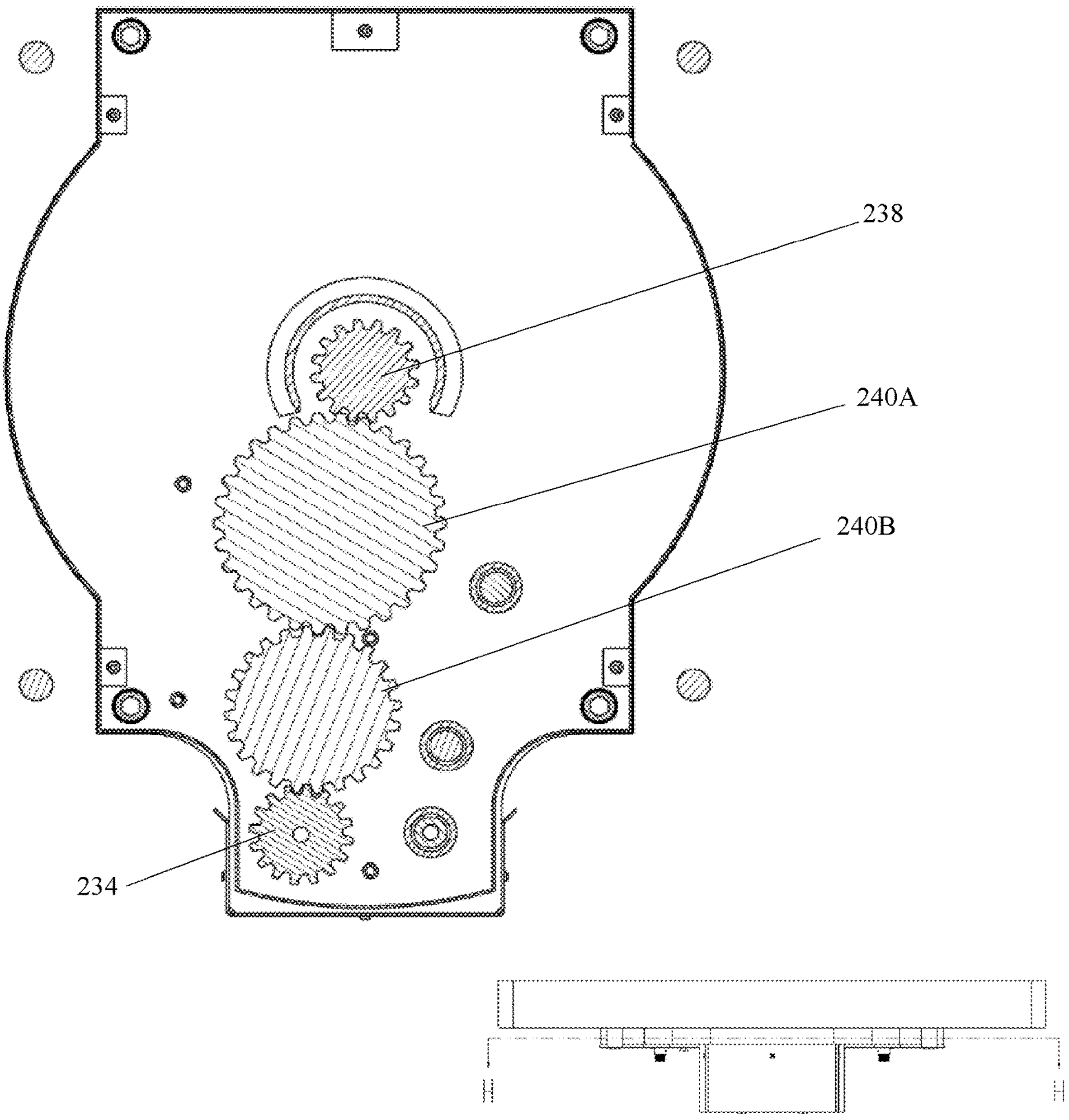
FIG. 3 (SECTION H-H)

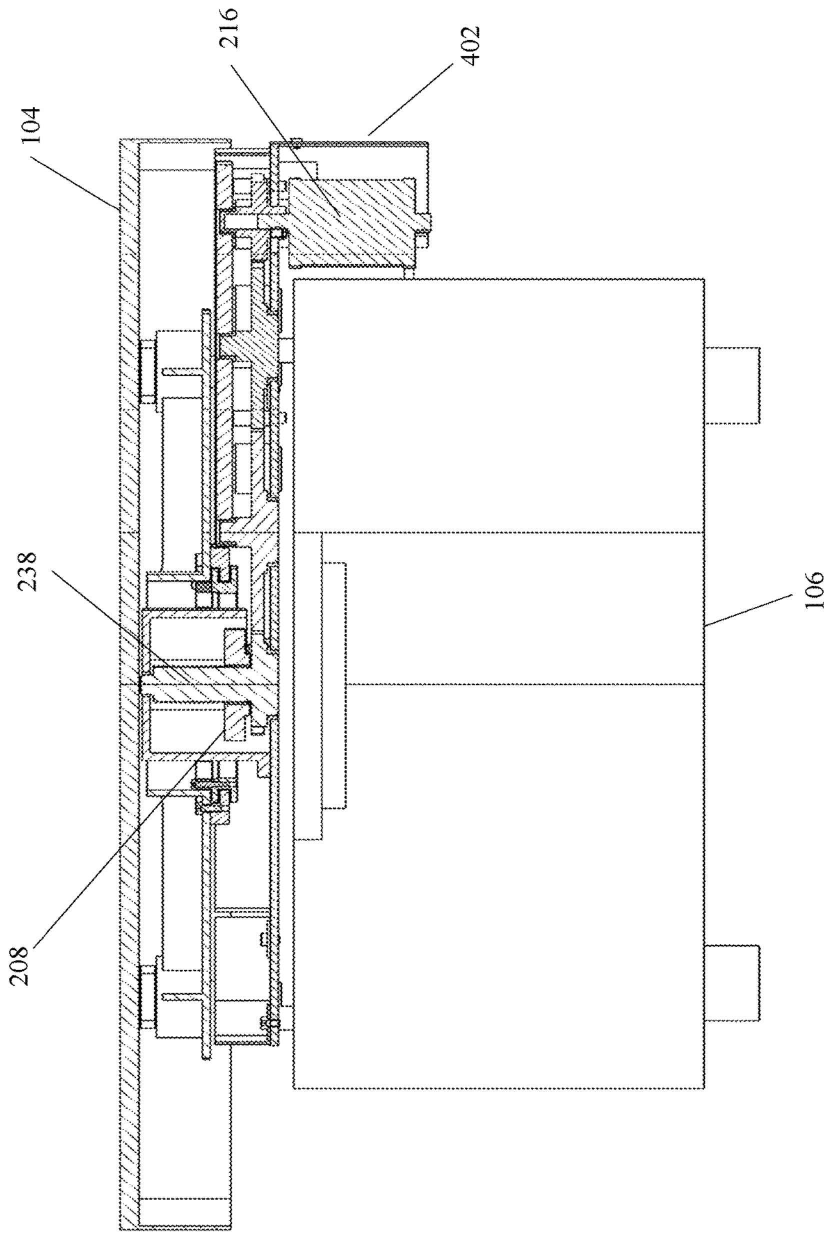
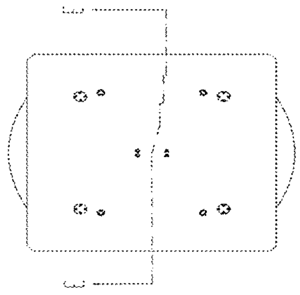
FIG. 4 (SECTION E-E)

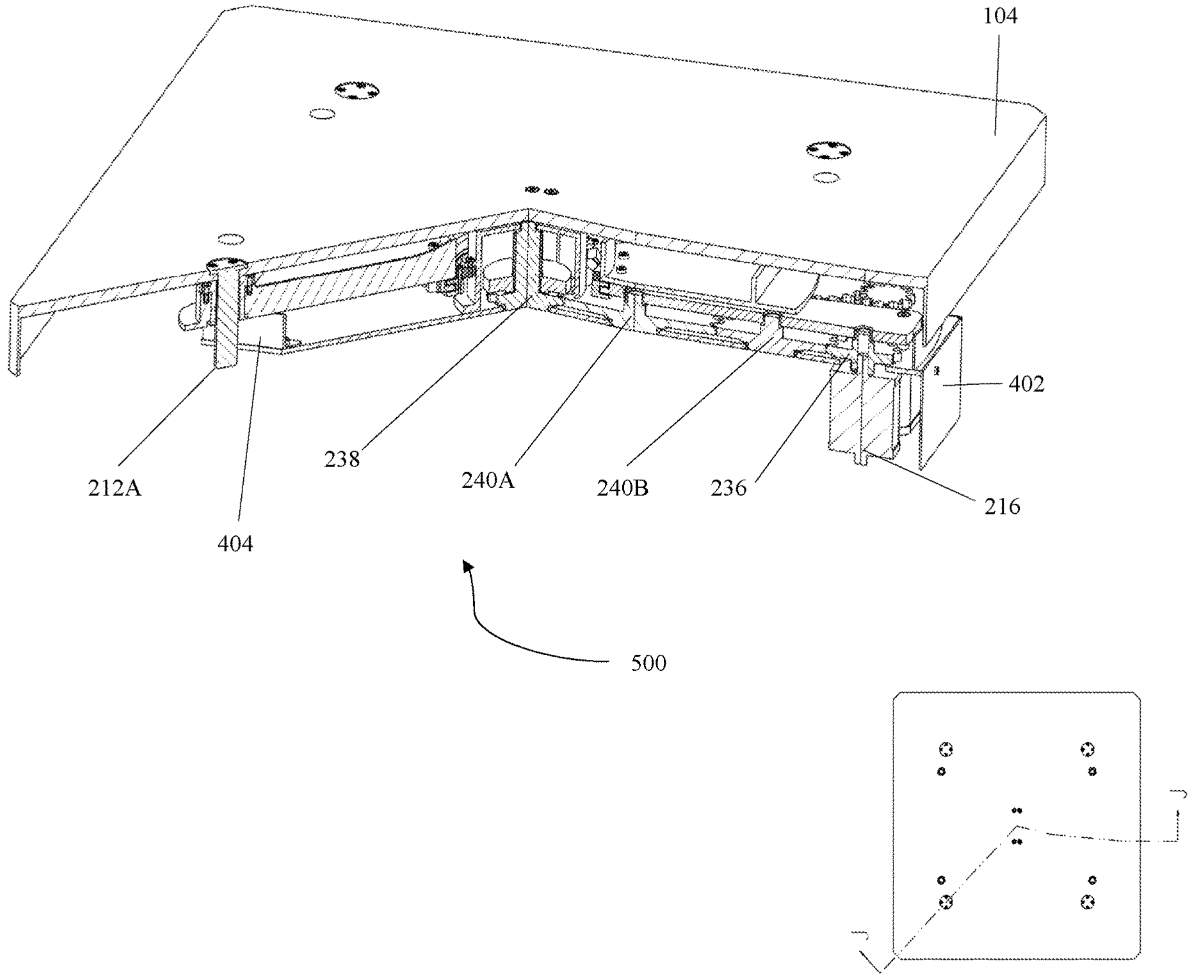
FIG. 5A (SECTION J-J)

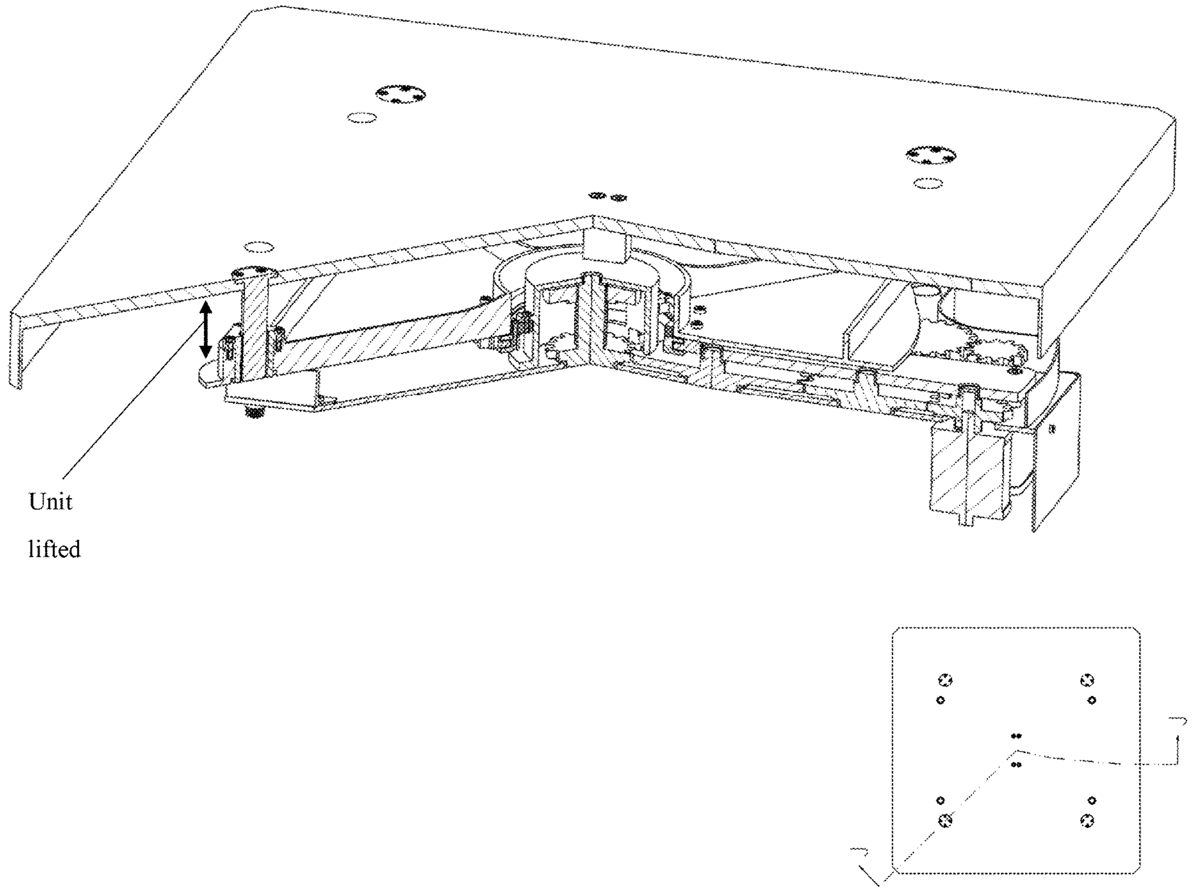
FIG. 5B (SECTION J-J)

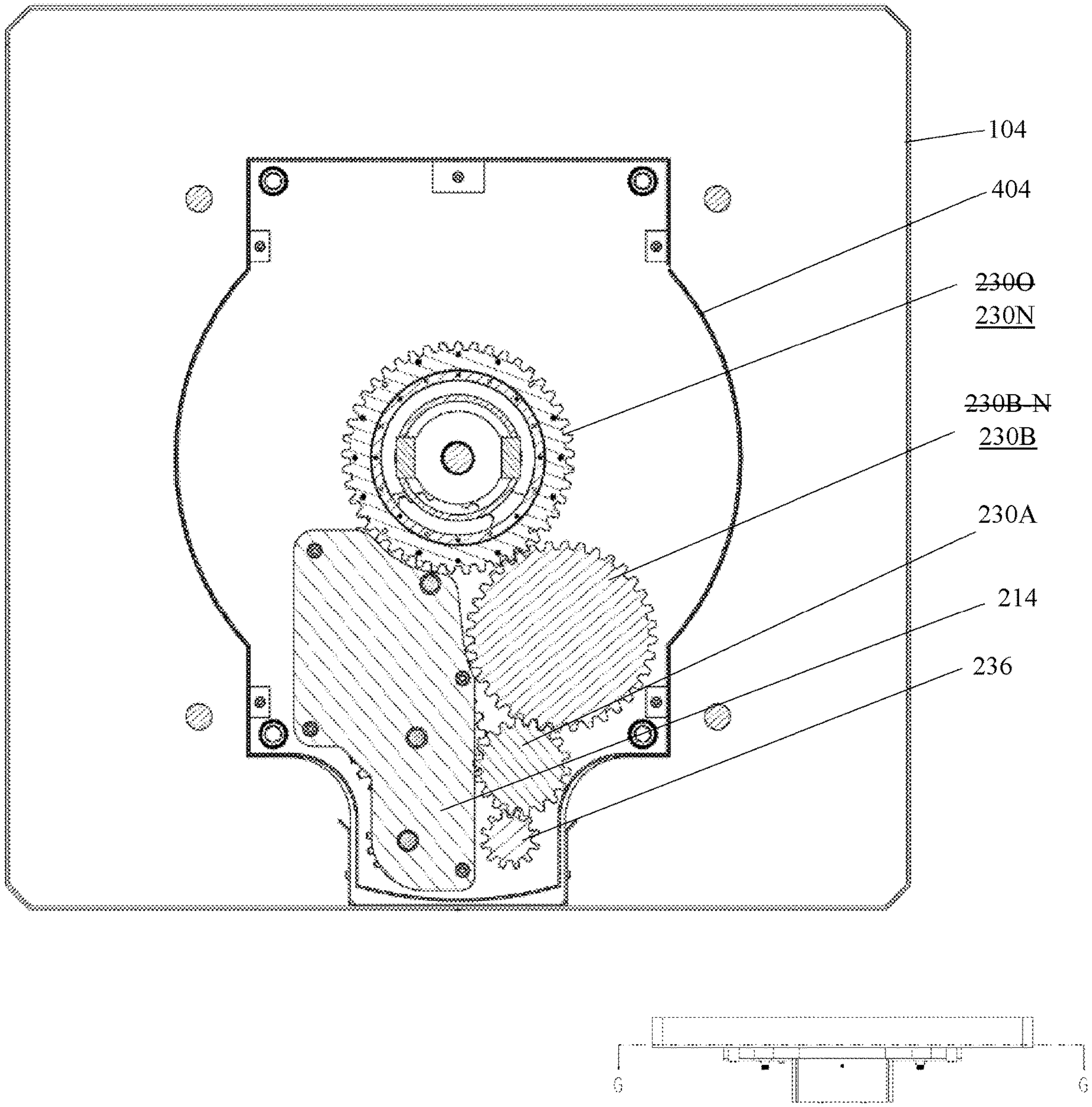
FIG. 6 (SECTION G-G)

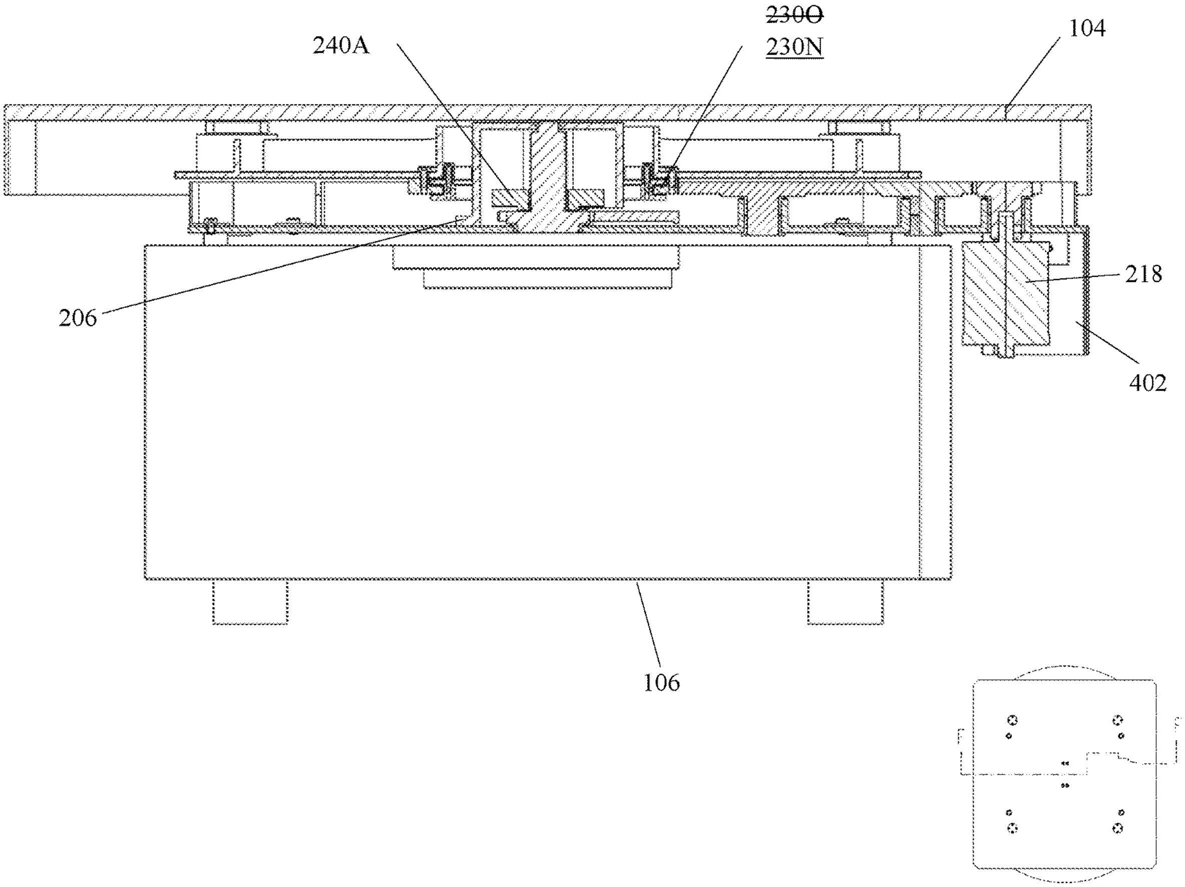
FIG. 7 (SECTION F-F)

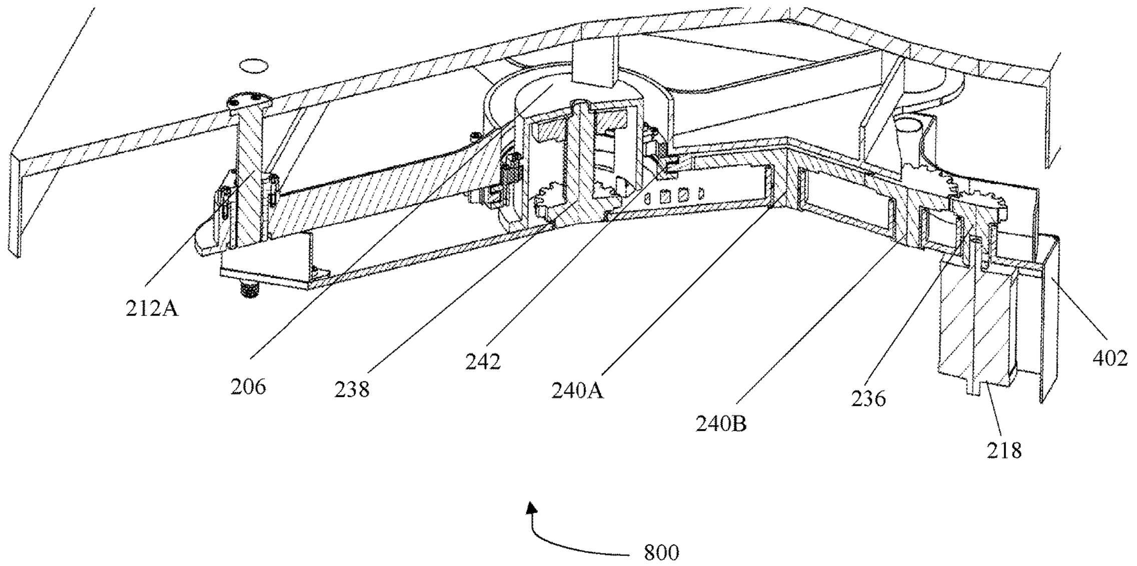
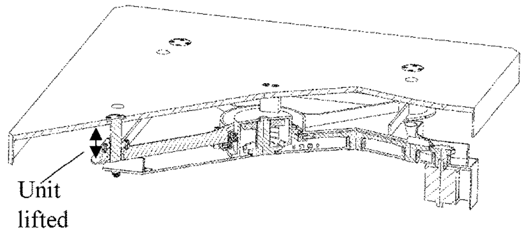
FIG. 8

LIFT AND ROTATE UNIT FOR LIFTING AND ROTATING A PLURALITY OF PAYLOADS

PRIORITY CLAIM

This U.S. patent application claims priority under 35 U.S.C. § 119 to: India application No. 202021028290, filed on Jul. 2, 2020. The entire contents of the aforementioned application are incorporated herein by reference.

TECHNICAL FIELD

This disclosure relates generally to a robotics system, and, more particularly, to a lift and rotate unit of the robotic system for lifting and rotating a plurality of payloads.

BACKGROUND

Industry 4.0 is now leading this change by transforming traditional warehouses into smart factories. An unrelenting need for increased productivity during a short span of time and delivery of end products with uniform quality has led industries towards automation. In retail warehouses one of latest scenario, goods to a picker concept, wherein the goods to be picked at retail warehouses are based on an order list, the goods are moved on vertical shelfs/racks where retail goods are stored inside. The goods are carried on an automated guided vehicle (AGVs) or an autonomous mobile robot (AMRs) and moved to the packer and a shipper in an automated way. This operation can be performed with a lifting apparatus placed on the shelf which is carried by the AGV.

Based on the order pattern, the specific shelfs/racks which have the retail objects inside it are picked up by multiple AGVs or AMRs with help of lifting apparatus and brought to stand near the packer (who is the picker) in the queue according to the order list. The retail object i.e., purchasing a phone along with phone cover or screen guard that can be found typically on online stores. The same object family may be kept in one of four faces of the shelf/rack for e.g., a particular brand of phone can be kept on one face of the shelf and screen guard of the same phone can be on another face/side of the shelf/rack. Then the shelf which is on top of AGV/AMR have to index/rotate about 360 degree in the packer's location for him/her to give access to other sides of shelf. Lots of complex lifting only apparatus and indexing/rotating only devices are there in present market. Very few devices exist with combination of lifting and rotating devices.

SUMMARY

Embodiments of the present disclosure present technological improvements as solutions to one or more of the above-mentioned technical problems recognized by the inventors in conventional systems. For example, in one embodiment, a lift and rotate unit to perform lifting and rotating of a plurality of payloads is provided. The lift and rotate unit include a first drive unit include a plurality of lift gears arranged in one plane, a lead screw shaft, a lift motor, a lead screw nut, a lift motor gear, and a top plate; a second drive unit with the plurality of rotary gears arranged in one plane, an driven rotary gear, a rotary motor, a rotary motor gear, and a rotating plate; the top plate with at least one guide shaft from a plurality of guide shafts is configured as a surface on which the plurality of the payloads is loaded; and the rotating plate with at least one linear bearing from a plurality of linear bearings to house the plurality of guide shafts at a plurality of corners and to rotate the top plate by the second drive unit. In an embodiment, the rotary motor on which the rotary motor gear drives the driven rotary gear through the plurality of the rotary gears mounted on a same plane.

In an embodiment, the first drive unit corresponds to a lift drive unit. In an embodiment, the second drive unit corresponds to a rotary drive unit. In an embodiment, the lead screw shaft is located at two ends through the at least one bearing at each end. In an embodiment, a first bearing of a plurality of bearings is sandwiched between a lower end of the lead screw shaft and a base plate. In an embodiment, a second bearing of the plurality of bearings is sandwiched between a top end of the lead screw shaft and a shaft housing. In an embodiment, the lead screw shaft includes a geared step for power transmission. In an embodiment, the at least one lift gear is connected between the lift motor gear the geared step of the lead screw shaft. In an embodiment, a belt transmission is performed by a belt connected between a driver lift motor pulley and a driven pulley coupled to the lead screw shaft. In an embodiment, at least one flange of the lead screw nut is integral bolted with the top plate. In an embodiment, the lead screw shaft is designed to rotate thereby causing a lead screw nut to move up or down on an axis of the lead screw shaft. In an embodiment, the at least one flange of the lead screw nut slides in an anti-rotation slot of the shaft housing as the lead screw shaft driven by the lift motor.

In an embodiment, the rotating plate is aligned in a central axis and designed to hold the at least one linear bearing whose axis are in line with the at least one guide shaft from the plurality of guide shafts connected with the top plate. In an embodiment, the driven rotary gear is driven by the rotary motor gear with the plurality of rotary gears for power transmission. In an embodiment, the lead screw shaft is mounted on the base plate with the plurality of bearings and at top hold by a gear housing and driven by the lift motor gear with the plurality of lift gears for a power transmission. In an embodiment, the at least one rotary gear is connected between the rotary motor gear to the driven rotary gear. In an embodiment, the driven rotary gear is coupled to the rotating plate, and the rotating plate rotates as the driven rotary gear is rotated.

In an embodiment, the rotating plate is connected to the top plate through the at least one linear bearing, and the at least one guided shaft to rotate the top plate at a desired angle. In an embodiment, the at least one linear bearing is integrated with the top plate. In an embodiment, the at least one guided shaft is coupled with the rotating plate. In an embodiment, a belt transmission is performed by a belt connected between a driver rotary motor pulley and a driven rotary pulley coupled to the shaft housing. In an embodiment, a C-shaped bearing is sandwiched between the driven rotary gear and the driven rotary gear holder. In an embodiment, the driven rotary gear holder is mounted to the shaft housing by a mounting ring. In an embodiment, the rotating plate is mounted on the driven rotary gear by a plurality of fasteners. In an embodiment, the first driving unit is mounted on the base plate by at least one bearing at bottom and hold by a gear mounting plate and a plurality of bearings at the top.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3 is a sectional view of a lift drive unit of the lift and rotate unit with arrangement of a plurality of gears, according to some embodiments of the present disclosure.

FIG. 4 is a sectional view of the lift drive unit with the autonomous mobile robot, according to some embodiments of the present disclosure.

FIGS. 5A-5B is a sectional view of the lift drive unit before and after lifting mechanism respectively, according to some embodiments of the present disclosure.

FIG. 6 is a sectional view of a rotary drive unit of the lift and rotate unit with arrangement of a plurality of rotary gears, according to some embodiments of the present disclosure.

FIG. 7 is a sectional view of the rotary drive unit with the autonomous mobile robot, according to some embodiments of the present disclosure.

FIG. 8 is a cross sectional 3D-view of the rotary drive unit, according to some embodiments of the present disclosure.

DETAILED DESCRIPTION

Figure 1:
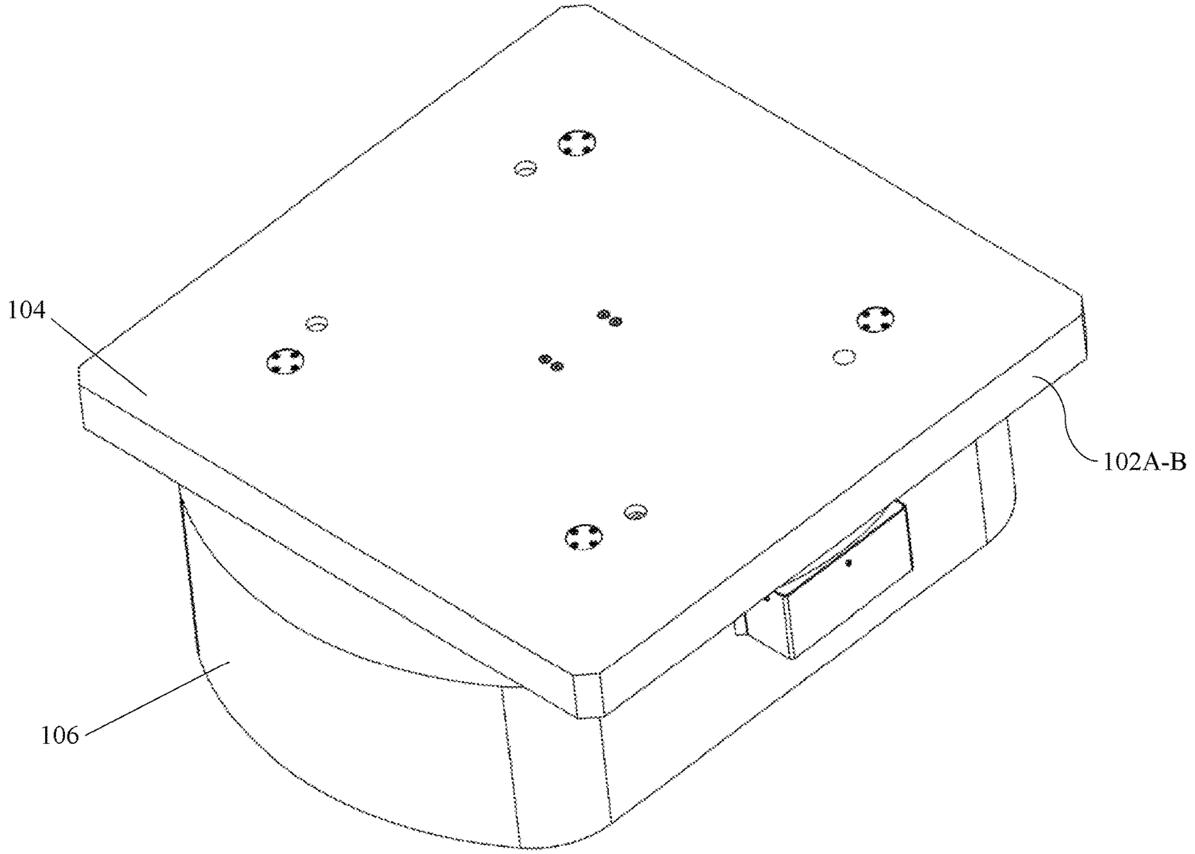
FIG. 1 is an isometric view of a lift and rotate unit mounted on an autonomous mobile robot, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The present disclosure provides a combined unit i.e., a lift and rotate unit for lifting and rotating a unit load/rack in a warehouse and a logistics area. The lift and rotate unit is mounted on top as an attachment of an autonomous mobile robot (AMR) or an automated guided vehicle (AGV) with an added function of movement which can transport the unit load or the rack from one position to another position autonomously or a guided way respectively. The AMR with the lift and rotate unit can go underneath the unit load or rack, and lifts the payloads from a ground, up to a certain height and then move/transport the payloads. The lift and rotate unit can rotate the payload (unit load/rack) to a required orientation. Further, the lift and rotate unit may work in reverse order to place the unit loads/racks onto the ground once destination point is reached by the AMR. A placement/position, navigation, path planning of unit loads/racks and destination identification are performed by the autonomous mobile robot/unit itself.

Referring now to the drawings, and more particularly to FIGS. 1 through 15B, where similar reference characters denote corresponding features consistently throughout the figures, there are shown preferred embodiments and these embodiments are described in the context of the following exemplary system and/or method.

Reference numerals of one or more components of an autonomous mobile robot (AMR) as depicted in the FIGS. 1 through 15B are provided in Table 1 below for ease of description.

| S.NO | NAME OF COMPONENT | REFERENCE NUMERALS |
|---|---|---|
| 1 | Lift and rotate unit | 102A-B |
| 2 | Top plate | 104 |
| 3 | Autonomous mobile robot/automated guided vehicle (AGV) | 106 |
| 4 | Base plate | 202 |
| 5 | Rotating plate | 204 |
| 6 | Shaft housing | 206 |
| 7 | Lead screw nut | 208 |
| 8 | Plurality of linear bearing | 210A-N |
| 9 | Plurality of guide shafts | 212A-N |
| 10 | Gear mounting plate | 214 |
| 11 | Lift motor | 216 |
| 12 | Rotary motor | 218 |
| 13 | Strengthening rib | 220 |
| 14 | Hole for linear bearing | 222 |
| 15 | Mounting holes | 224 |
| 16 | Mounting ring | 226 |
| 17 | Stand offs | 228 |
| 18 | Plurality of rotary gears | 230A-N |
| 19 | Driven rotary gear | 230N |
| 20 | Driven rotary pulley | 230N' |
| 21 | Driven rotary gear holder | 232 |
| 22 | Lift motor gear | 234 |
| 23 | Rotary motor gear | 236 |

-continued

| S.NO | NAME OF COMPONENT | REFERENCE NUMERALS |
|---|---|---|
| 24 | Driver lift motor pulley | 234' |
| 25 | Driver Rotary motor pulley | 236' |
| 26 | lead screw shaft | 238 |
| 27 | Plurality of lift gears | 240A-B |
| 28 | C shaped bearing | 242 |
| 29 | Plurality of fasteners | 244A-N |
| 30 | Protecting cover for motor | 402 |
| 31 | Protecting cover for mechanism | 404 |
| 32 | First drive unit | 500 |
| 33 | Second drive unit | 800 |
| 34 | First end of the lift gear | 902 |
| 35 | Second end of the lift gear | 904 |
| 36 | First end of the rotary gear | 1002 |
| 37 | Second end of the rotary gear | 1004 |
| 38 | First end of the lift motor gear | 1102 |
| 39 | Second end of the lift motor gear | 1104 |
| 40 | first end of the rotary motor gear | 1106 |
| 41 | second end of the rotary motor gear | 1108 |
| 42 | Top end of the lead screw nut | 1202 |
| 43 | Bottom end of the lead screw nut | 1204 |
| 44 | Plurality of flanges of the lead screw nut | 1206A-B |
| 45 | First end of lead screw shaft | 1208 |
| 46 | Second end of lead screw shaft | 1210 |
| 47 | Geared step | 1212 |
| 48 | Driven pulley | 1212' |
| 49 | Plurality of Slots | 1302A-B |
| 50 | Hole for lead screw shaft | 1304 |
| 51 | Plurality of flanges of a gear housing | 1306A-D |
| 52 | Rack | 1502 |

Figure 15A:
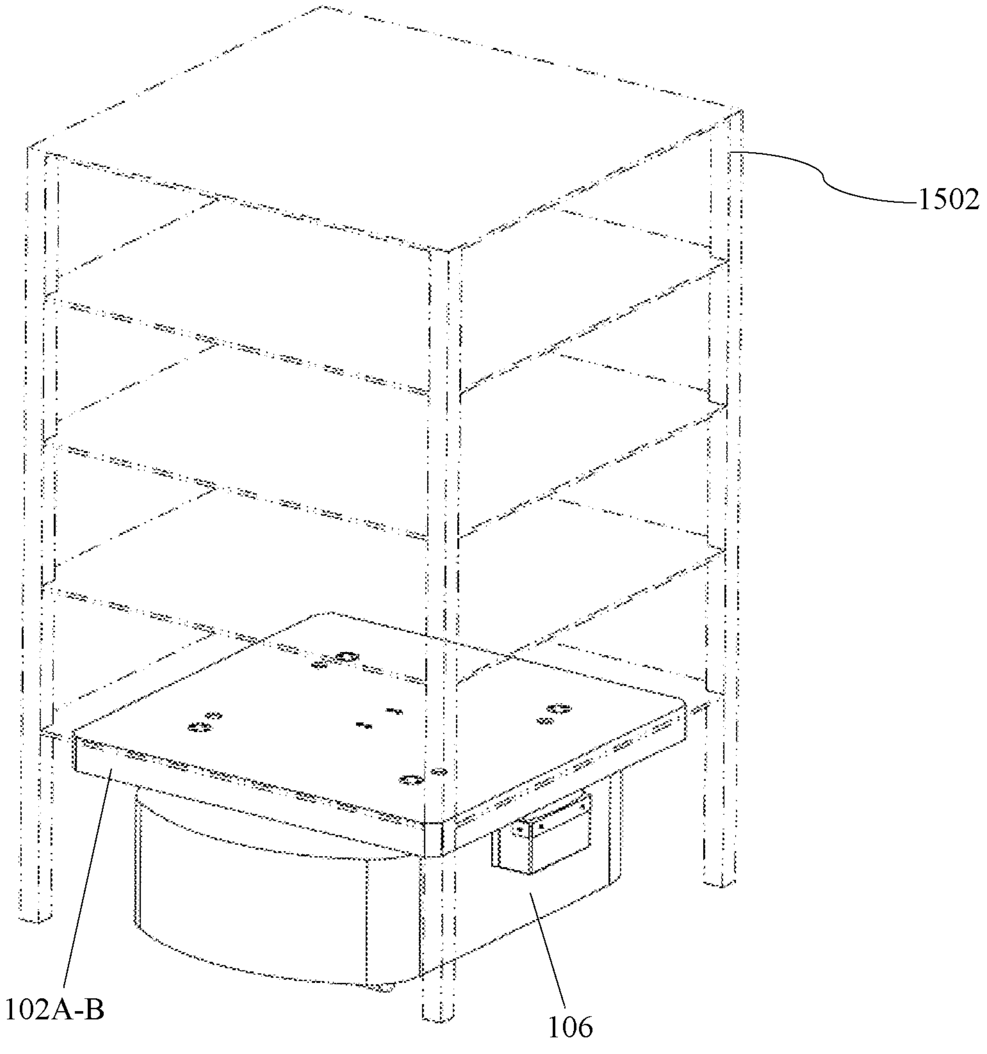
FIG. 15A is an isometric view illustrates an exemplary application of the lift and rotate unit mounted on the autonomous mobile robot which carry plurality of payloads, according to some embodiments of the present disclosure.
Figure 15B:
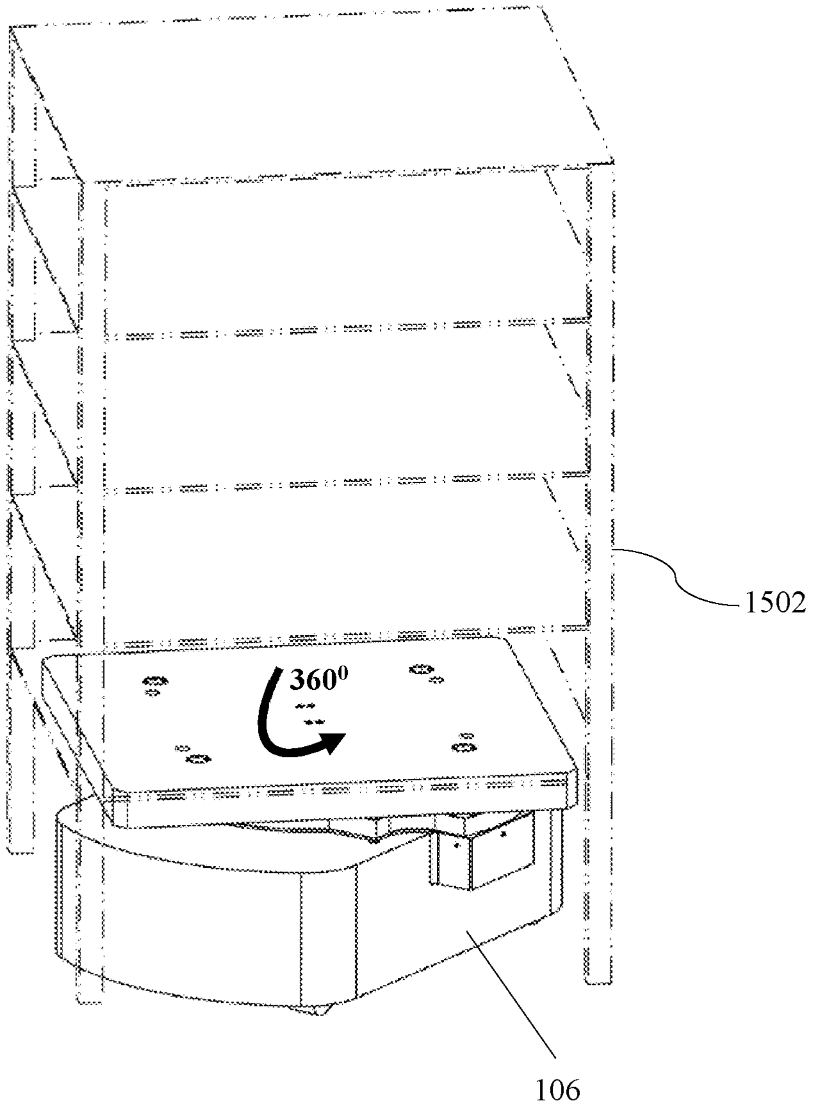
FIG. 15B is an isometric view illustrating an exemplary application of the lift and rotate unit mounted on the autonomous mobile robot which rotate the plurality of payloads at a desired orientation, according to some embodiments of the present disclosure.

FIG. 1 is an isometric view of the lift and rotate unit 102A-B mounted on the autonomous mobile robot 106, according to some embodiments of the present disclosure. The lift and rotate unit 102A-B is configured for lifting and rotating of a plurality of payloads i.e., a unit load or the rack 1502 (as depicted in FIGS. 15A and 15B) in a warehouse and a logistics area. In an embodiment, the lift and rotate unit 102A-B specifically designed to mount onto the autonomous mobile robot (AMR)/automated guided vehicle (AGV) 106. For example, a modular platform which can easily mount onto the autonomous mobile robot 106 for utilizing in the warehouses and the logistics areas to move/transport the unit loads, the rack 1502, and carts etc. The lift and rotate unit 102A-B can be easily mount on at least one of: (a) static body where changing of orientation of product/object is required, (b) static body where change in vertical position is required, (c) moving body like the autonomous mobile robot 106 with medium speed to transport the payloads from one location to another location, (d) moving body like AMR 106 where only lifting is required, and (e) rotation while moving of the AMR 106 is required. In an embodiment, the lift and rotate unit 102A-B can be used as a lift table.

As depicted in FIG. 5A, the lift and rotate unit 102A-B include the first drive unit 500 and the second driving unit 800 (as depicted in FIG. 8). In an embodiment, the first drive unit 500 corresponds to a drive unit for lifting mechanism and the second driving unit 800 corresponds to a drive unit for rotating mechanism. In an embodiment, each drive unit is placed at two different levels to accommodate the plurality of gears and two power transmission line. In an embodiment, the plurality of gears corresponds to the plurality of rotary gears 230A-M, and the plurality of lift gears 240A-B. The top plate 104 with at least one guide shaft 212A from the plurality of guide shafts 212A-N configured as a surface on which an actual loading of the payloads. The rotating plate 204 with the at least one linear bearing 210A from the plurality of linear bearings 210A-N to house the plurality of guide shafts 212A-N at a plurality of corners and to rotate the top plate 104 by the second drive unit 800. In an embodiment, the rotary motor 218 on which the rotary motor gear 236 drives the driven rotary gear 230N through the plurality of the rotary gears 230A-M mounted on a same plane.

Figure 2A:
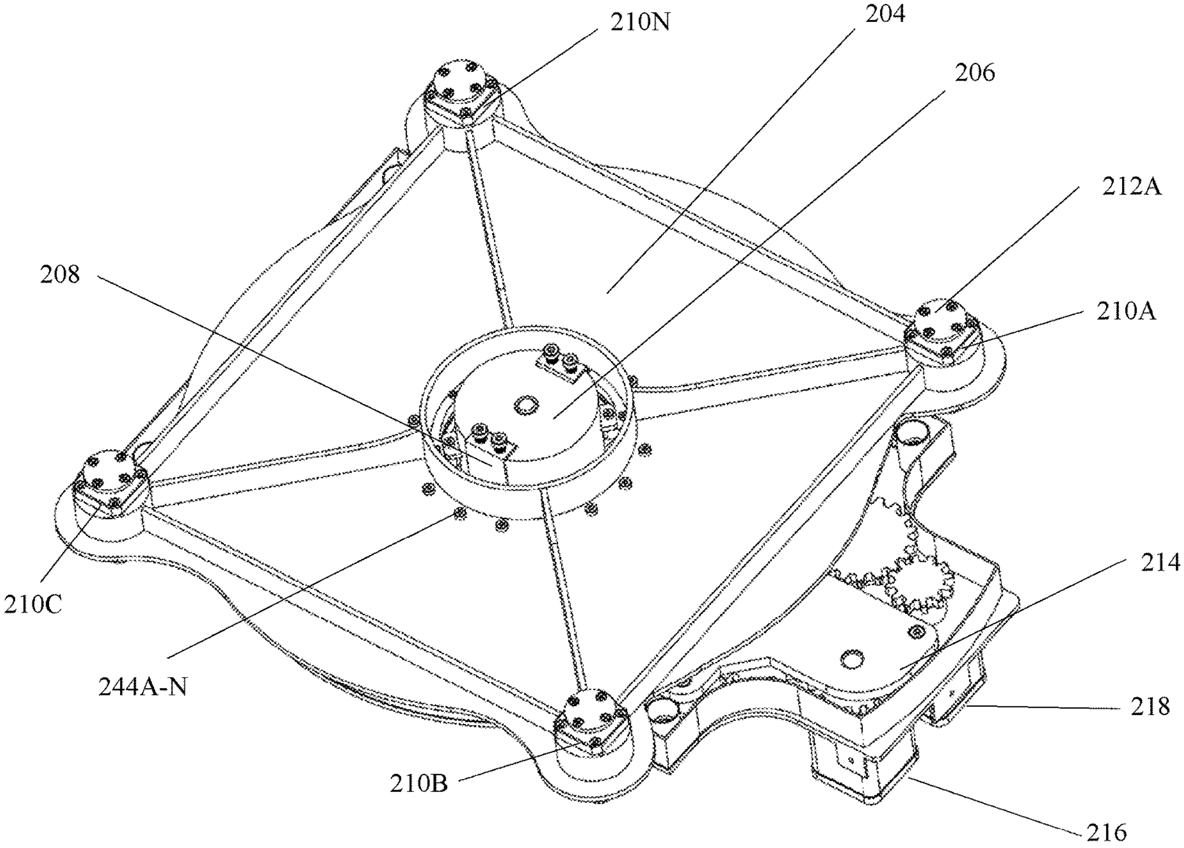
FIG. 2A is an isometric view of the lift and rotate unit without a top plate, according to some embodiments of the present disclosure.

FIG. 2A is an isometric view of the lift and rotate unit 102A-B without the top plate 104, according to some embodiments of the present disclosure. FIG. 20 is an isometric view of the lift and rotate unit 102A-B without the top plate 104 and the rotating plate 204, according to some embodiments of the present disclosure. The lift and rotate unit 102A-B include three main plates in the mechanism i.e. the base plate 202, the top plate 104, and the rotating plate 204. The base plate 202 is mounted on the autonomous mobile robot 106 or on a static table which act as a supporting plate for the lifting and rotating mechanism. In an embodiment, the top plate 104 act as a working surface on which the plurality of payloads is loaded, the plurality of guide shafts (e.g., four guide shafts) 212A-N are fixed at four ends of the top. During lift mechanism, the plurality of guide shafts (e.g., four guide shafts) 212A-N is configured to slide up/down along the plurality of linear bearings (e.g., four linear bearings) 210A-N. In an embodiment, the top plate 104 is made with one or more side plates to look like a box structure which prevents an object entry inside the mechanism and act as a protective cover for entire unit. In an embodiment, in retail warehouse, when a picker have to pick from any one of the one or more sides of a storage rack about 360 degree and rotation can be bidirectional.

Figure 2B:
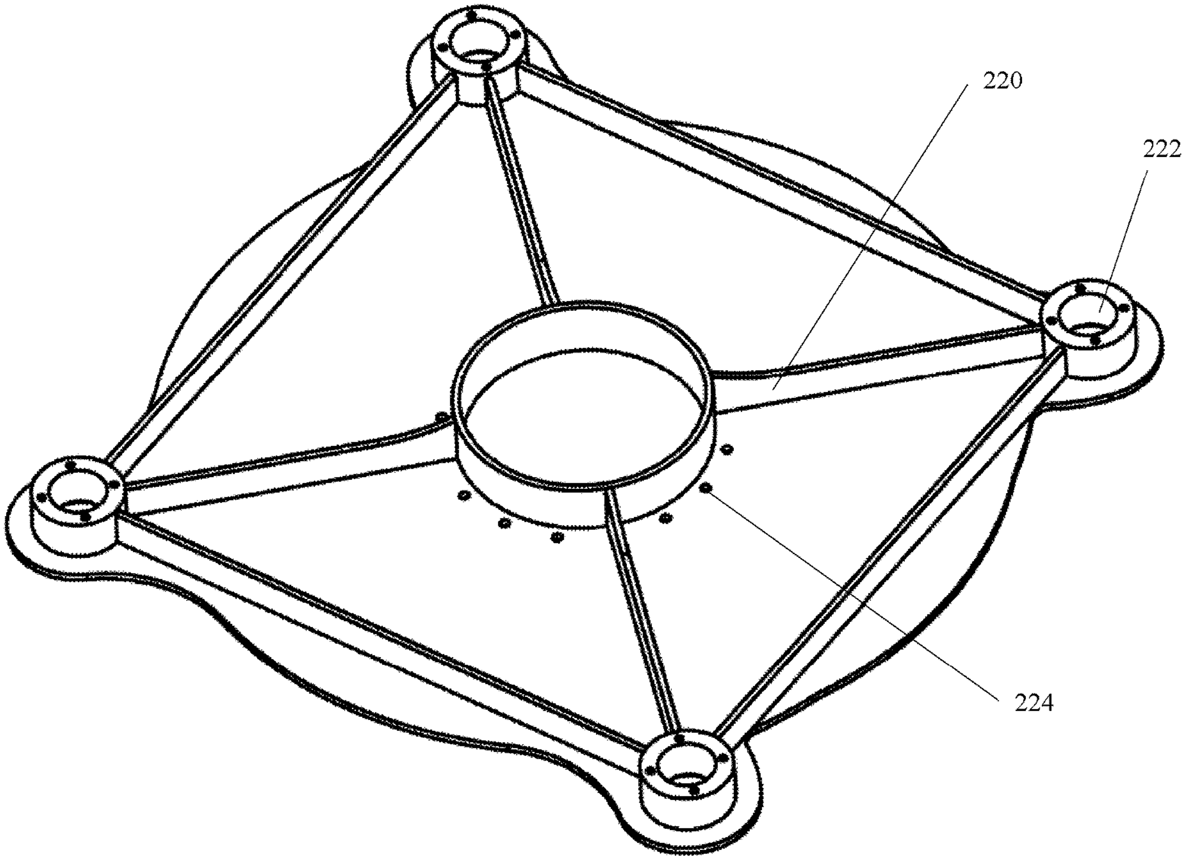
FIG. 2B is an isometric view of a rotating plate of the lift and rotate unit, according to some embodiments of the present disclosure.
Figure 2C:
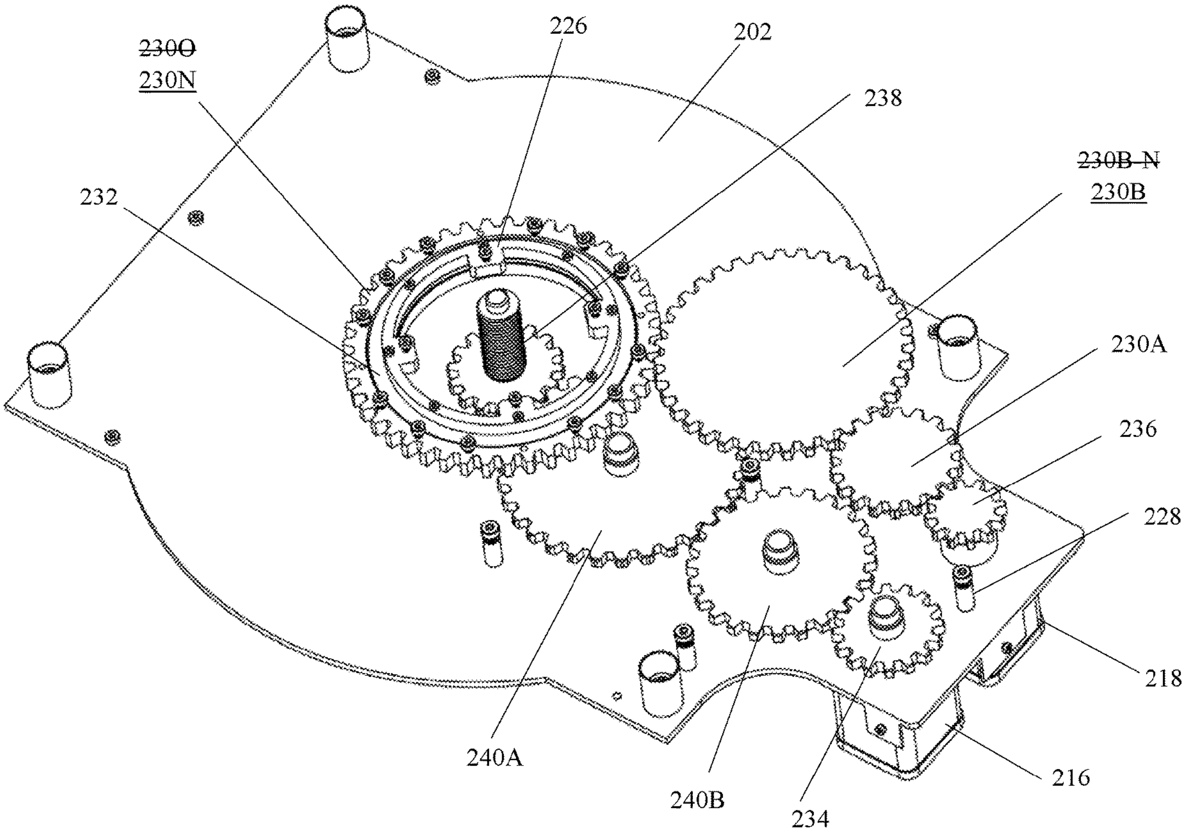
FIG. 2C is an isometric view of the lift and rotate unit without the top plate and the rotating plate, according to some embodiments of the present disclosure.
Figure 9A:
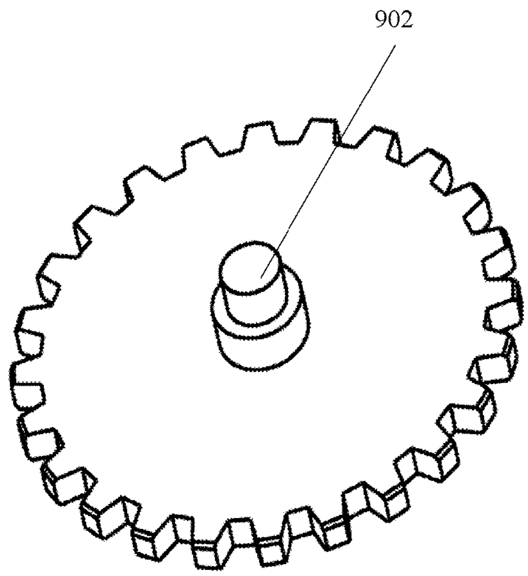
FIGS. 9A-9B is an isometric view of a plurality of lift gears of the lift and rotate unit, according to some embodiments of the present disclosure.
Figure 9B:
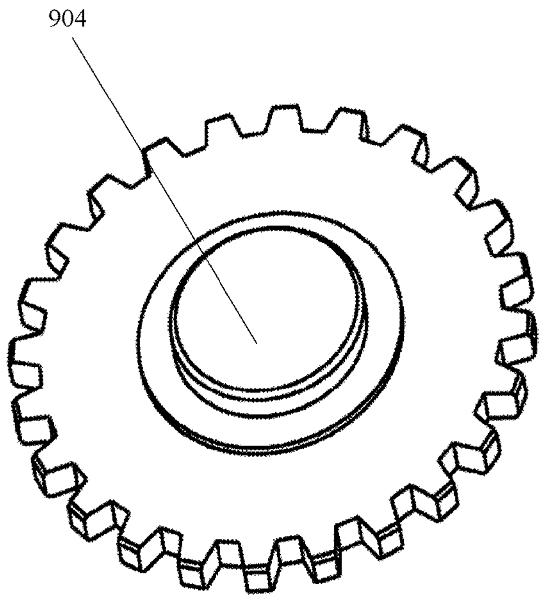

FIG. 2B is an isometric view of the rotating plate 204 of the lift and rotate unit 102A-B, according to some embodiments of the present disclosure. The rotating plate 204 is configured to rotate the top plate 104 by the rotary drive unit 800. The rotating plate 204 also include four holes at four corners of the rotating plate 204 for the linear bearings 210A-N. The rotating plate 204 is mounted in a central axis and designed to hold the at least one linear bearing 210A whose axis are in line with the at least one guide shaft 212A from the plurality of guide shafts 212A-N connected with the top plate 104. The rotating plate 204 is connected to the top plate 104 through the at least one linear bearing 210A, and the at least one guided shaft 212A to rotate the top plate 104 at a desired angle. In an embodiment, the at least one linear bearing 210A is integrated with the top plate 104. In an embodiment, the at least one guided shaft 212A is coupled with the rotating plate 204. In an embodiment, a C-shaped bearing 242 is sandwiched between the driven rotary gear 230N and the driven rotary gear holder 232. In an embodiment, the driven rotary gear holder 232 is mounted to the shaft housing 206 by a mounting ring 226. In an embodiment, the rotating plate 204 is mounted on the driven rotary gear 230N by a plurality of fasteners 244A-N.

FIG. 3 is a sectional view of the lift drive unit 500 of the lift and rotate unit 102A-B with arrangement of the plurality of gears, according to some embodiments of the present disclosure. FIG. 4 is a sectional view of the lift drive unit 500 with the autonomous mobile robot 106, according to some embodiments of the present disclosure. FIGS. 5A-5B is a sectional view of the lift drive unit 500 before and after lifting mechanism respectively, according to some embodiments of the present disclosure. In an embodiment, the first driving unit 500 corresponds to the lift drive unit. In an embodiment, the second driving unit 800 corresponds to the rotary drive unit. The first drive unit 500 include the plurality of lift gears 240A-B arranged in one plane, the lead screw shaft 238, the lift motor 216, the lead screw nut 208, the lift motor gear 234, and the top plate 104.

The lift drive unit 500 include the lift motor 216 which is mounted on the base plate 202 from bottom and attached to the one or more gears to the lead screw shaft 238. In an embodiment, the lead screw shaft 238 may correspond to a lead screw on which a nut is travelling where the actual lifting of the top plate 104 is happening. The top plate 104 also include the plurality of guide shafts (e.g., four guide shafts) 212A-N fixed at a plurality of corners (e.g., four corners) of the plate which slides inside the one or more linear bearings 210A-N fixed at four corners of the rotating plate 204 during lifting and lowering. The lift motor 216 drives the lead screw shaft 238 through the plurality of the lift gears 240A-B. The lift motor 216 is fixed to the base plate 202 and the first end 1102 of the lift motor gear 234 (as referred in FIGS. 11A and 11B which is an isometric view of the rotary motor gear 236 and the lift motor gear 234 of the lift and rotate unit 102A-B, according to some embodiments of the present disclosure) is coupled to the lift motor 216 for lifting mechanism. The lift motor gear 234 rotates the lift gear 240B which in turn rotates the lift gear 240A and lead to the rotation of the lead screw shaft 238.

In an embodiment, as the lead screw shaft 238 rotates and move the lead screw nut 208 upwards. In an embodiment, the lead screw nut 208 is arrested by two slots of the shaft housing 206 (as referred in FIG. 13) which provides anti-rotation for the lead screw nut 208 and only allows to slide along the slots. The second end 1104 of the lift motor gear 234 is connected to the gear mounting plate 214 with one or more bearings. Similarly, the first end 902 of the one or more lift gears 240A-B (as referred in FIGS. 9A-9B which is an isometric view of the plurality of lift gears 240A-B of the lift and rotate unit 102A-B, according to some embodiments of the present disclosure) is connected to the gear mounting plate 214 with help of the one or more bearings 210A-N and the second end 904 of the one or more lift gears 240A-B is connected to the base plate 202.

The second end 1208 of the driven lead screw shaft 238 (as referred in FIGS. 12A-12B which is an isometric view of the lead screw nut 208 and the lead screw shaft 238 of the lift and rotate unit 102A-B, according to some embodiments of the present disclosure) is mounted on the base plate 202 with help of the one or more linear bearing 210A-N at bottom and first end is arrested at the top of gear housing. The lead screw shaft 238 is located at two ends through the at least one bearing at each end. In an embodiment, a first bearing of the plurality of bearings is sandwiched between the lower end 1208 of the lead screw shaft 238 and the base plate 202. In an embodiment, a second bearing of the plurality of linear bearings is sandwiched between the top end 1210 of the lead screw shaft 238 and a shaft housing 206. In an embodiment, the lead screw shaft 238 include the geared step 1212 for power transmission. In an embodiment, the at least one lift gear 240A is connected between the lift motor gear 234 the geared step 1212 of the lead screw shaft 238. An at least one flange 1206A of the lead screw nut 208 is integral bolted with the top plate 104. The lead screw shaft 238 is designed to rotate thereby causing a lead screw nut 208 to move up or down on an axis of the lead screw shaft 238. The at least one flange 1206A of the lead screw nut 208 slides in an anti-rotation slot of the shaft housing 206 as the lead screw shaft 238 driven by the lift motor 216. The lead screw shaft 238 is mounted on the base plate 202 with the plurality of bearings and at top hold by a gear housing and driven by the lift motor gear 234 with the plurality of lift gears 240A-B for a power transmission. The lead screw nut 208 is fastened to the driven lead screw shaft 238. There are mounting holes 224 for the top plate 104 at the top end of the two flanges 1206A-B of the lead screw nut 208, with which the top plate 104 gets mounted. In an embodiment, the lead screw shaft 238 to rotate thereby causing a lead screw nut 208 to move up or down on an axis of the lead screw shaft 238.

In an embodiment, a rotary motion of the lead screw shaft 238 translates into a linear (i.e., lifting) moment of the lead screw nut 208 in turns raising the top plate 104. The shaft housing 206 is mounted on the base plate 202 and guides the lead screw nut 208 through a slot cut. The top plate 104 is mounted onto the lead screw nut 208 and include the four guide shafts screwed at the four corners of the top plate 104. In an embodiment, as the lead screw nut 208 moves up (i.e., lifting) or down (i.e., lowering) the top plate 104 with the four guide shafts 212A-N slides inside the one or more linear bearings 210A-N mounted on the rotating plate 204 at four corners of the top plate 104. In an embodiment, the rotating plate 204 is rotated by another drive unit and the rotary gears 240A-B are mounted on same plane. In an embodiment, the first driving unit 500 is mounted on the base plate 202 by at least one bearing at bottom and hold by the gear mounting plate 214 and a plurality of bearings at the top.

Figure 10A:
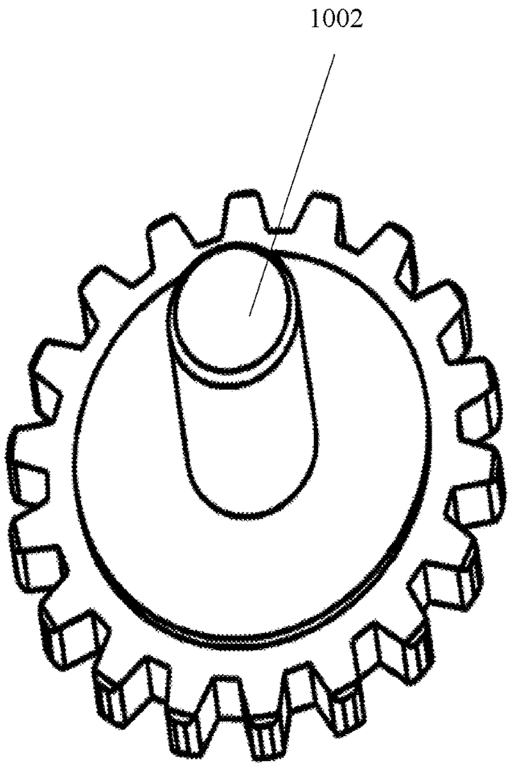
FIGS. 10A-10B is an isometric view of a plurality of rotary gears of the lift and rotate unit, according to some embodiments of the present disclosure.
Figure 10B:
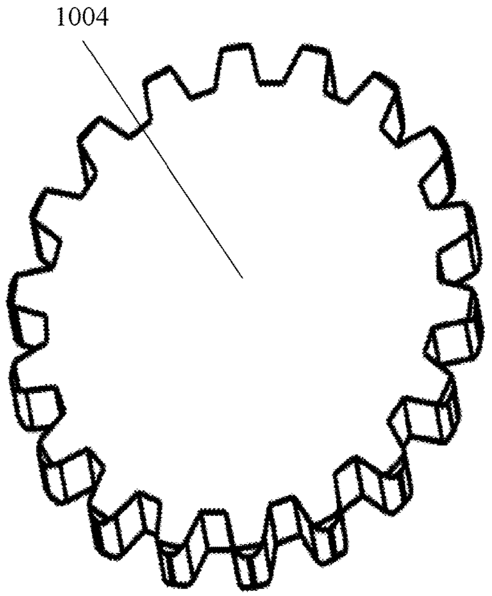
Figure 11A:
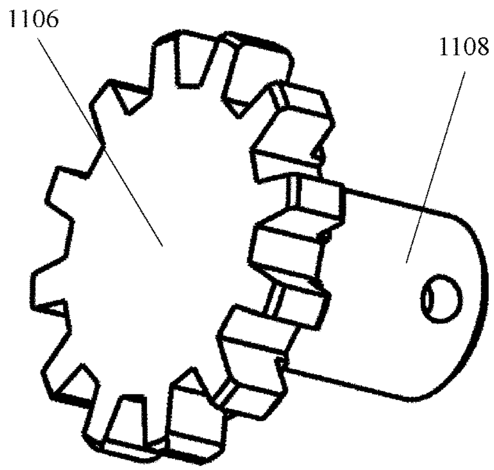
FIGS. 11A-11B is an isometric view of a rotary motor gear and a lift motor gear of the lift and rotate unit, according to some embodiments of the present disclosure.
Figure 11B:
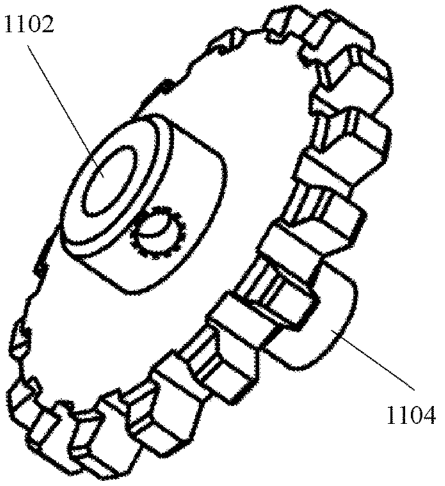
Figure 12A:
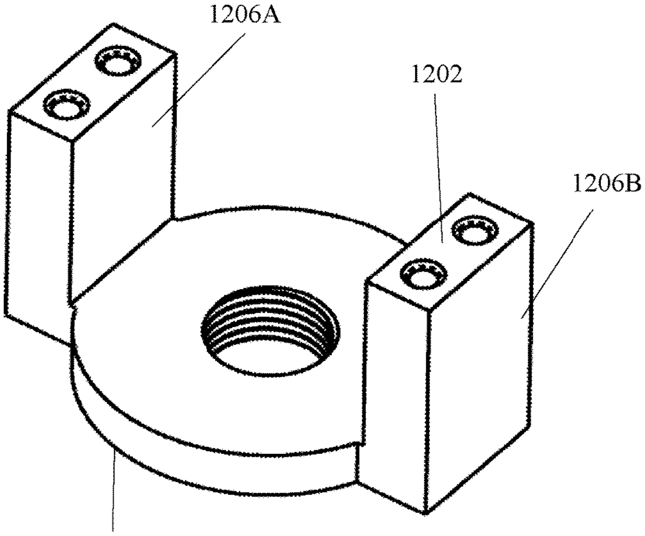
FIGS. 12A-12B is an isometric view of a lead screw nut and a lead screw shaft of the lift and rotate unit, according to some embodiments of the present disclosure.
Figure 12B:
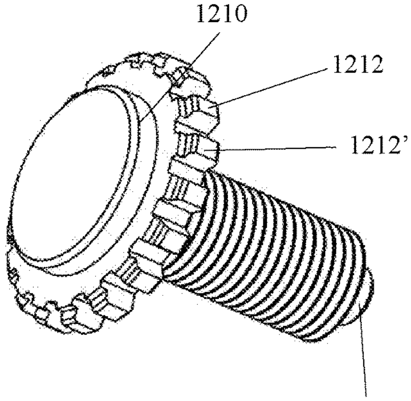
Figure 13:
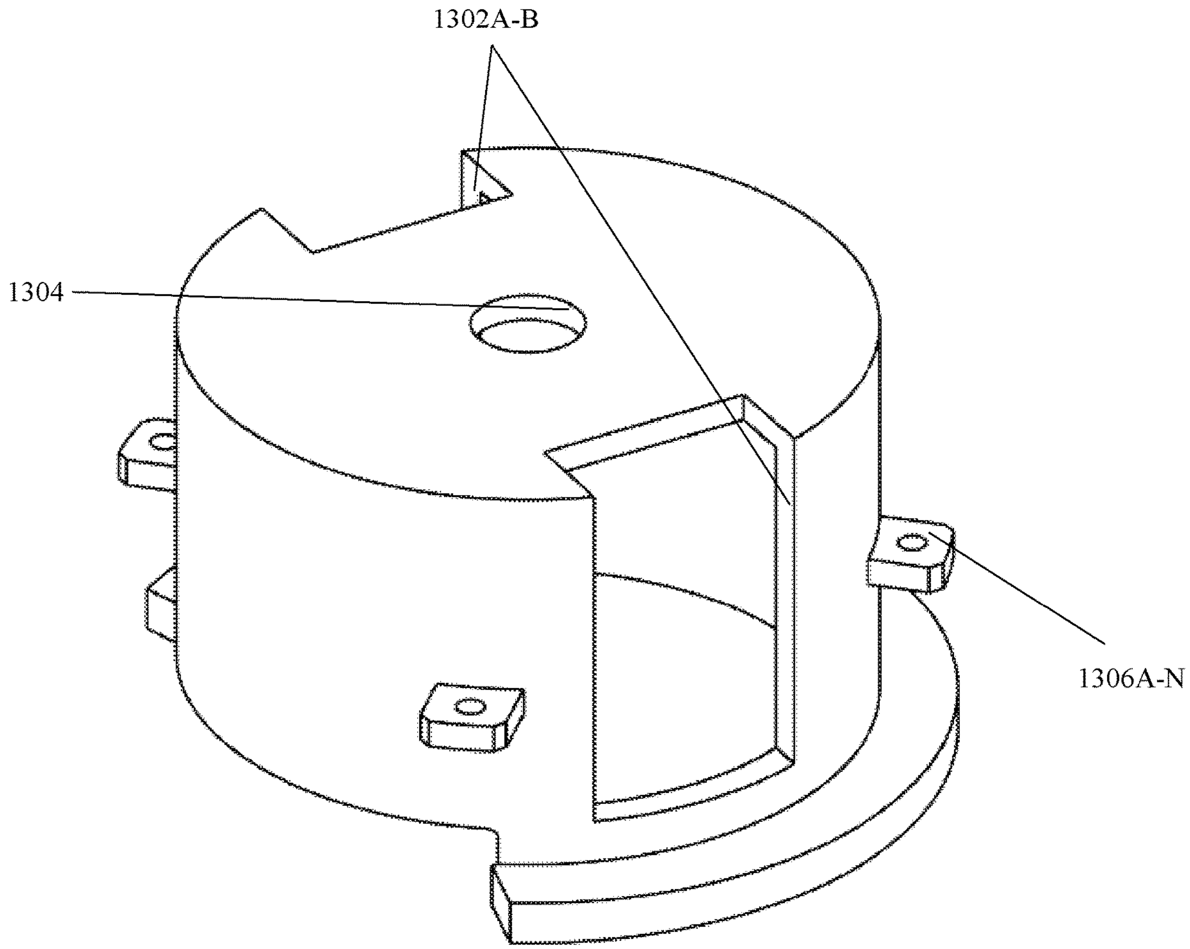
FIG. 13 is an isometric view of a shaft housing of the lift and rotate unit, according to some embodiments of the present disclosure.

FIG. 6 is a sectional view of the rotary drive unit 800 of the lift and rotate unit 102A-B with arrangement of the plurality of rotary gears 230A-M, according to some embodiments of the present disclosure. FIG. 7 is a sectional view of the rotary drive unit 800 with the autonomous mobile robot 106, according to some embodiments of the present disclosure. FIG. 8 is a cross sectional 3D-view of the rotary drive unit 800, according to some embodiments of the present disclosure. The second drive unit 800 with the plurality of rotary gears 230A-M arranged in another plane, the driven rotary gear 230N, the rotary motor 218, the rotary motor gear 236, and the rotating plate 204. FIGS. 10A-10B is an isometric view of the plurality of rotary gears 230A-M of the lift and rotate unit 102A-B, according to some embodiments of the present disclosure. In an embodiment, the plurality of rotary gears 230A-M may correspond to a first rotary gear 230A, a second rotary gear 230B, and the driven rotary gear 230N with varied size and shape.

The rotary drive unit 800 is mounted to the shaft housing 206 by the mounting ring 226 and the rotating unit 102B rotates as the at least one rotary gear 230A rotates about a center axis of the mechanism. The rotary drive unit 800 include the rotary motor 218 which is mounted on the base plate 202 from bottom and attached to the plurality of rotary gears 230A-M to the driven rotary gear 230N where actual rotary moment is happening. The rotary motor 218 rotates the second rotary gear 230B which in turn rotates the first rotary gear 230A that leads to the rotation by the rotary gear holder 232. The driven rotary gear 230N is driven by the rotary motor gear 236 with the plurality of rotary gears 230A-M for power transmission. The at least one rotary gear 230A is connected between the rotary motor gear 236 to the driven rotary gear 230N, wherein the driven rotary gear 230N is coupled to the rotating plate 204 to rotate the rotating plate 204.

The first end 1106 of the rotary motor gear 236 is coupled to the rotary motor 218 to rotate whole mechanism. Similarly, the first end 1002 of the plurality of rotary gears 230A-M is connected to the base plate 202 at bottom with the help of the one or more linear bearings 210A-N. In an embodiment, there is bearing in between the driven rotary gear 230N and the driven rotary gear holder 232 so that the first rotary gear 230A is powered by the rotary motor gear 236. The rotating plate 204 is mounted rigidly to the first rotary gear 230A which revolves in the driven rotary gear holder 232. In an embodiment, as the first rotary gear 230A rotates by the plurality of rotary gears 240A-N rotated by the rotary motor 218 for rotating the rotating plate 204 automatically turns at a required angle.

In an embodiment, since there is linear connection between one or more guide shafts 212A-N and the one or more linear bearings 210A-N, the rotating plate 204 turns the top plate 104 through required angle as driven and controlled by motor for rotating. This arrangement leads the rotary drive unit to rotate the entire unit through any angle as required. In an embodiment, the protecting cover for mechanism 404 is mounted on the base plate 202 which hides an internal mechanism and resist an object entry into one or more drive systems.

Figure 14A:
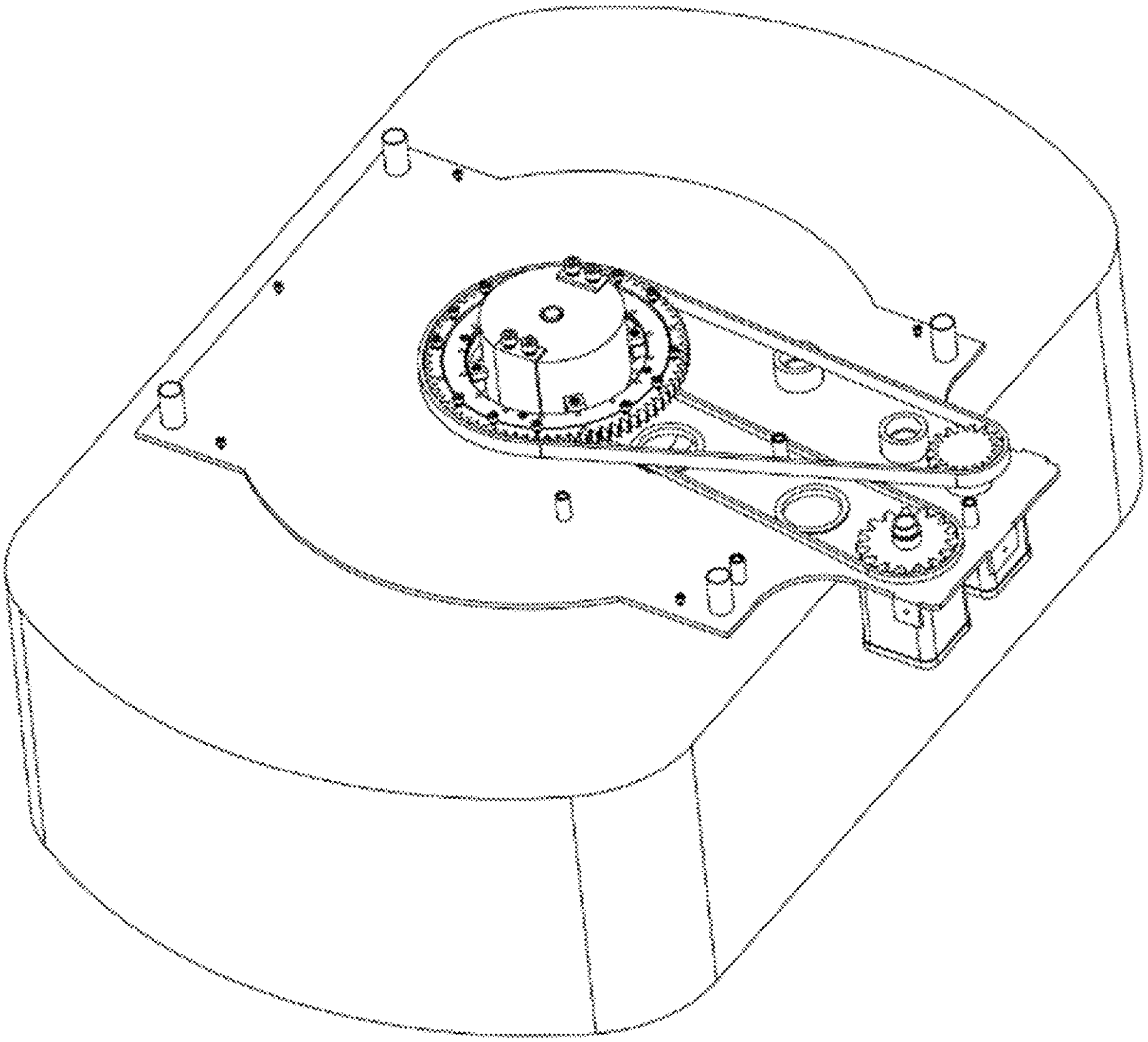
FIG. 14A is an exemplary isometric view of the lift and rotate unit with belt, according to some embodiments of the present disclosure.
Figure 14B:
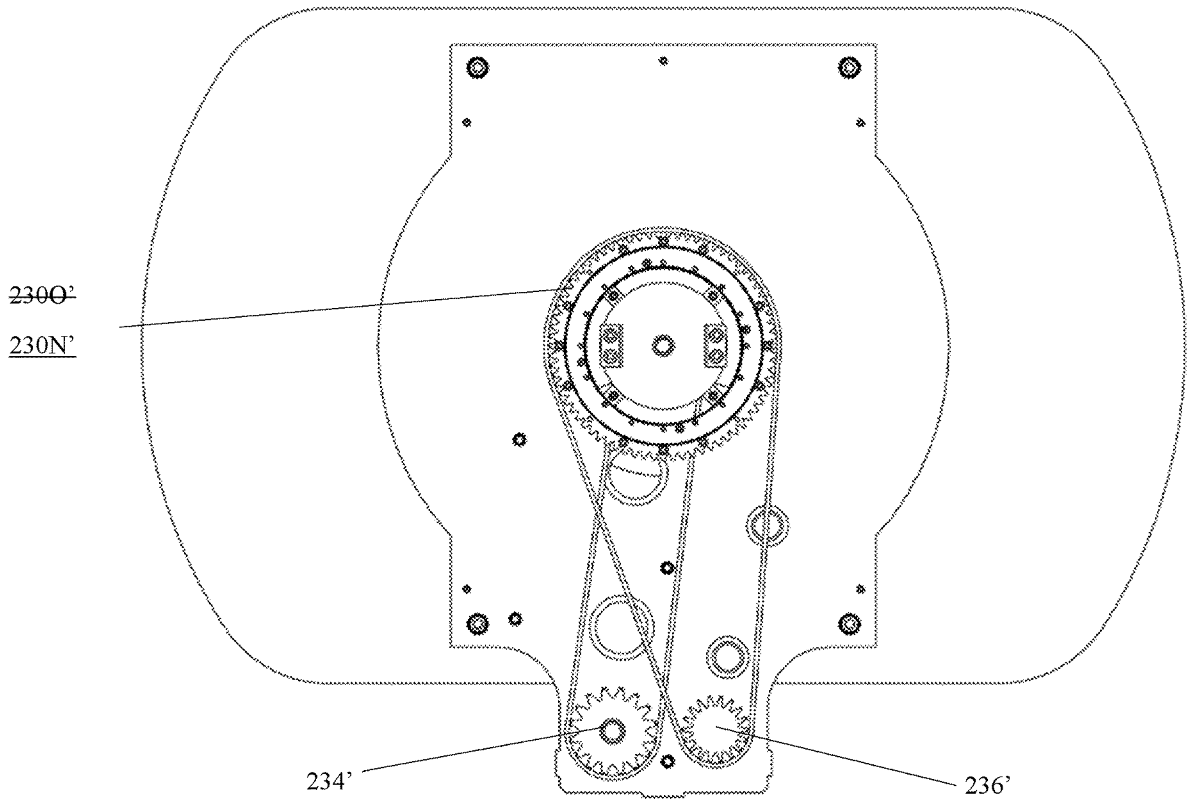
FIG. 14B is a top view of the lift and rotate unit with the belt, according to some embodiments of the present disclosure.

FIG. 14A is an exemplary isometric view of the lift and rotate unit 102A-B with pulley belts, according to some embodiments of the present disclosure. FIG. 14B is a top view of the lift and rotate unit 102A-B with the pulley belts, according to some embodiments of the present disclosure. In an alternate embodiment, mechanism for lifting and rotating with the lift and rotate unit 102A-B is also replaced with the pully belt. For example, instead the plurality of lift gears 240A-B and the plurality of rotary gears 230A-M the whole mechanism can be replaced with the timer belts to performing lift and rotate mechanism. In an embodiment, the pulley belt may correspond to but not limited to a timer pulley or a toothed belt pulley, V belt pulley, a round belt pulley, and a flat belt pulley. A belt transmission is performed by a belt connected between a driver lift motor pulley 234') and a driven pulley 1212' coupled to the lead screw shaft 238. A belt transmission is performed by a belt connected between a driver rotary motor pulley 236' and a driven rotary pulley 230N' coupled to the shaft housing 206.

FIG. 15A is an isometric view illustrates an exemplary application of the lift and rotate unit 102A-B mounted on the autonomous mobile robot 106 which carry the plurality of payloads, according to some embodiments of the present disclosure. The rack 1502 is filled with the plurality of payloads which is placed over the lift and rotate unit 102A-B mounted on the autonomous mobile robot 106. FIG. 15B is an isometric view illustrating an exemplary application of the lift and rotate unit mounted on the autonomous mobile robot to rotate the plurality of payloads at a desired orientation, according to some embodiments of the present disclosure. The rack 1502 is filled with the plurality of payloads which is placed over the lift and rotate unit 102A-B mounted on the autonomous mobile robot 106. The plurality of payloads placed on the top plate 104 can be rotated at a desired angle.

The embodiment of the present disclosure provides an apparatus/unit designed with two independent drive units i.e., one for lifting and another for rotating a unit loads or the racks in the warehouse and the logistics areas. The lift and rotate unit specifically designed to mount onto an autonomous mobile vehicle. The lift and rotate unit with help of an autonomous mobile robot or an autonomous guided vehicle can transfer the unit loads or the racks and carts from one position to another position autonomously. The embodiment of the present disclosure provides a combined unit for lifting and rotating mechanism in which the lifting mechanism is performed by a side mounted motor with the plurality of lift gears to rotate the lead screw. The lead screw nut of the lead screw is connected to top mounting plate. Similarly, the rotating mechanism is performed by another bearing with the set of gears and the servo motor to rotate the platform.

The embodiment of the present disclosure in which the top plate of the lift and rotate unit is provided with four through holes for easy accessibility which helps during mounting of whole unit onto the AMR. This simple feature made entire unit as plug and play unit-which can mount/demount easily.

The embodiment of the present disclosure in which the lifting and rotating unit is completely isolated from the autonomous vehicle in the sense of lifting/rotation i.e. the unit is independently lift the and rotate by itself, whereas the autonomous mobile vehicle can remain static or dynamic or vice versa. The embodiment of the present disclosure provides rotatory application which need higher torque applications and relatively lower speed applications. For example, start rotating and stop (indexing to any angle, incremental and bidirectional). In another example, manufacturing fixtures, assembly fixtures, high rise racks, transfer conveyers. Lifting such as transfer conveyers, lifting happens for ground clearance when there is high rise racks to enable the transportation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A lift and rotate unit to perform lifting and rotating of a plurality of payloads, comprising:

a first drive unit comprises:
- a plurality of lift gears arranged in one plane,
- a lead screw shaft located at two ends through at least one linear bearing of a plurality of linear bearings at each of the two ends, wherein a first linear bearing of the plurality of linear bearings is sandwiched between a lower end of the lead screw shaft and a base plate, and wherein a second linear bearing of the plurality of linear bearings is sandwiched between a top end of the lead screw shaft and a shaft housing, wherein the lead screw shaft comprises a geared step for power transmission,
- a lift motor,
- a lead screw nut,
- a lift motor gear, and
- a top plate;

a second drive unit with a plurality of rotary gears arranged in another plane, a driven rotary gear, a rotary motor, a rotary motor gear, and a rotating plate;

the top plate with at least one guide shaft from a plurality of guide shafts is configured as a surface on which the plurality of payloads is loaded; and the rotating plate with at least one linear bearing from the plurality of linear bearings to house the plurality of guide shafts at a plurality of corners and to rotate the top plate by the second drive unit.

2. The lift and rotate unit as claimed in claim 1, wherein the first drive unit corresponds to a lift drive unit, and the second drive unit corresponds to a rotary drive unit.

3. The lift and rotate unit as claimed in claim 1, wherein at least one lift gear of the plurality of lift gears is connected between the lift motor gear and the geared step of the lead screw shaft.

4. The lift and rotate unit as claimed in claim 1, wherein a belt transmission is performed by a belt connected between a driver lift motor pulley and a driven pulley coupled to the lead screw shaft.

5. The lift and rotate unit as claimed in claim 1, wherein at least one flange of the lead screw nut is integral bolted with the top plate.

6. The lift and rotate unit as claimed in claim 1, wherein the lead screw shaft is designed to rotate thereby causing the lead screw nut to move up or down on an axis of the lead screw shaft.

7. The lift and rotate unit as claimed in claim 1, wherein at least one flange of the lead screw nut slides in an anti-rotation slot of the shaft housing as the lead screw shaft driven by the lift motor.

8. The lift and rotate unit as claimed in claim 1, wherein the rotating plate is aligned in a central axis and designed to hold the at least one linear bearing, wherein an axis of the at least one linear bearing is in line with the at least one guide shaft from the plurality of guide shafts.

9. The lift and rotate unit as claimed in claim 1, wherein the driven rotary gear is driven by the rotary motor gear with the plurality of rotary gears for power transmission.

10. The lift and rotate unit as claimed in claim 1, wherein the lead screw shaft is mounted on the base plate with the plurality of linear bearings and held by a gear housing and driven by the lift motor gear with the plurality of lift gears for a power transmission.

11. The lift and rotate unit as claimed in claim 1, wherein at least one rotary gear of the plurality of rotary gears is connected between the rotary motor gear to the driven rotary gear, wherein the driven rotary gear is coupled to the rotating plate, and the rotating plate rotates as the driven rotary gear rotates.

12. The lift and rotate unit as claimed in claim 1, wherein the rotating plate is connected to the top plate through the at least one linear bearing, and the at least one guided shaft to rotate the top plate at a desired angle, wherein the at least one linear bearing is integrated with the top plate, wherein the at least one guided shaft is coupled with the rotating plate.

13. The lift and rotate unit as claimed in claim 1, wherein a belt transmission is performed by a belt connected between a driver rotary motor pulley and a driven rotary pulley coupled to the shaft housing.

14. The lift and rotate unit as claimed in claim 1, wherein a C-shaped bearing is sandwiched between the driven rotary gear and a driven rotary gear holder, wherein the driven rotary gear holder is mounted to the shaft housing by a mounting ring, wherein the rotating plate is mounted on the driven rotary gear by a plurality of fasteners.

15. The lift and rotate unit as claimed in claim 1, wherein the first drive unit is mounted on the base plate by the at least one linear bearing and held by a gear mounting plate and the plurality of linear bearings.

* * * * *